United States Patent [19]
Lin et al.

[11] Patent Number: 5,436,925
[45] Date of Patent: Jul. 25, 1995

[54] COLLIDING PULSE MODE-LOCKED FIBER RING LASER USING A SEMICONDUCTOR SATURABLE ABSORBER

[75] Inventors: Hong Lin, Palo Alto; Kok-Wai Chang, Sunnyvale; David K. Donald, Palo Alto, all of Calif.

[73] Assignee: Hewlett-Packard Company, Palo Alto, Calif.

[21] Appl. No.: 205,671

[22] Filed: Mar. 1, 1994

[51] Int. Cl.⁶ .................................. H01S 3/08
[52] U.S. Cl. ............................ 372/92; 372/6; 372/11; 372/98; 372/18; 372/25; 372/94; 372/27
[58] Field of Search ............... 372/92, 94, 6, 11, 18, 372/25, 98

[56] References Cited
U.S. PATENT DOCUMENTS

| | | | |
|---|---|---|---|
| 4,504,950 | 3/1985 | Auyeung | 372/20 |
| 5,056,096 | 10/1991 | Baker et al. | 372/18 |
| 5,237,577 | 8/1993 | Keller et al. | 372/11 |
| 5,251,230 | 10/1993 | Lau et al. | 372/94 |
| 5,276,701 | 1/1994 | Shirasaki | 372/6 |
| 5,278,855 | 1/1994 | Jacobovitz-Vesella et al. | 372/11 |

*Primary Examiner*—Léon Scott, Jr.
*Attorney, Agent, or Firm*—Deborah A. Neville

[57] ABSTRACT

A CPM mode-locked fiber ring laser including an ion-implanted semiconductor saturable absorber providing sub-picosecond pulses at rapid repetition rates. The laser provides compact, turn-key capability and is polarization insensitive.

21 Claims, 4 Drawing Sheets

COLLIDING PULSE MODE-LOCKED FIBER RING LASER USING A SEMICONDUCTOR SATURABLE ABSORBER

FIELD OF INVENTION

The invention relates to lasers and more particularly to a laser assembly providing a colliding pulse mode-locked (CPM) fiber ring laser using a semiconductor saturable absorber.

BACKGROUND OF INVENTION

Optical fiber systems need reliable sources of short light pulses at high repetition rates to carry information through optical fibers. The information carried ranges from telephone conversations, to television signals, to digital computer data. Sources of short light pulses are also needed for lightwave instruments and generally in fields of scientific research. Currently available picosecond and sub-picosecond duration lasers require highly skilled personnel to operate the lasers because of the great number and complexity of optical adjustments and alignments. There is a need for an easily operable laser capable of producing sub-picosecond light pulses.

Short optical pulses are essential for testing the time response of fiber optic communication systems. The time response is related to the maximum rate of transmitting information. As the speed of telecommunications systems increases, the need for sub-picosecond testing impulse source becomes more acute.

Mode-locking is an important technique for generating ultrashort pulses. Mode-locking causes the oscillation energy of the laser to be condensed into a packet in time domain that travels back and forth inside a laser cavity—the consequences of fixing the phases of the longitudinal modes of a laser. It is well known that mode-locked lasers can produce short optical pulses on the order of sub-picosecond pulses or shorter. Mode-locking occurs spontaneously in some lasers if the optical path contains a saturable absorber (an absorber whose absorption decreases with increasing optical intensity). This is the method used to induce mode-locking in continuous dye lasers, due to the fact that a dye will absorb less power from a mode-locked train of pulses than from a random phase oscillation of many modes since the first form of oscillation leads to the highest possible peak intensities (for a given average power of the laser) and is attenuated less severely as a consequence. For a general discussion see Yariv, A., *Quantum Electronics*, 2nd Ed. New York: Wiley (1975); *Optical Electronics*, 3rd Ed. New York: Holt, Rinehart & Winston (1985).

Colliding pulse mode-locked (CPM) dye lasers have been reported to have produced light pulses of 1 picosecond or shorter. (See Fork et al., "Generation of optical pulses shorter than 0.1 psec by colliding pulse mode locking" *Appl. Phys. Lett.* vol. 38, No. 9, pp 671–2 (1961)). Ring lasers have the unique capability of oscillating simultaneously or independently in either of two distinct counter-propagating directions. Colliding pulse mode-locking (CPM) uses two synchronized counter-propagating pulses interacting in a thin saturable absorber to produce a short pulse.

Since becoming commercially available, erbium-doped fiber has become the preferred gain medium for generating short optical pulses in actively and passively mode-locked lasers. Mode-locking of erbium fiber lasers has been demonstrated using active modulators, saturable absorbers, polarization switching, and non-linear amplifying loop mirrors.

Saturation (the condition in which the population difference has reached a steady state) is very important to the laser theory. Saturation of the inverted population difference and hence the gain in an amplifying laser medium is what determines a laser's power output. When a laser oscillator begins to oscillate, the oscillation amplitude grows at first until the intensity inside the cavity is sufficient to saturate and therefore reduce the laser gain. Steady-state oscillation then occurs when the saturated laser gain becomes just equal to the total cavity losses, so that the net round trip gain is exactly unity. Gain saturation is thus the primary mechanism that determines the power level at which a laser will oscillate. Siegman, *Lasers*, University Science Books, p 207-8 (1986).

It is well known that semiconductors have two categories of properties: electronic and optical. (See *Understanding Lasers*, ch 8, IEEE, 1992.) For a fiber laser using a semiconductor as a saturable absorber, optical properties are important. The key parameters are bandgap and carrier lifetime. Bandgap is the energy spacing between the conduction band and the valence band and represents the energy (frequency) of light which just begins to produce electrons and holes in the semiconductor. Near the edge of the bandgap the number of available states for electron/hole production is limited. The word "gap" is used to describe the lack of energy levels for electrons and holes in between the conduction band and the valence band if the light frequency is too low.

In semiconductor material, electrons are in the valence bands under normal circumstances. When light with energy level equal to or greater than the semiconductor's band gap energy encounters the semiconductor, the light energy is absorbed, causing some electrons to transit to the conduction band and create electron-hole pairs. The electron-hole pairs eventually decay; the average lifetime is termed the "carrier lifetime."

There are two kinds of decay processes: radiative and non-radiative. In the radiative decay process, an electron drops back from the conduction band to valence band with a photon emitted at a frequency proportional to the band gap energy. The radiative decay process has a time constant of several nanosecond ($10^{-9}S$) which is intrinsic to the particular semiconductor material.

Non-radiative decay is a process by which an electron and a hole combine without generating light. Common mechanisms for non-radiative recombination are defects and impurities in a semiconductor. The time constant of non-radiative process depends on the density of the impurities and defects and can be shorter than 1 picosecond. Semiconductor saturable absorbers use the mechanism of absorption saturation. As mentioned previously, when a semiconductor absorbs light, the electrons transit from valence bands to conduction bands thus creating electron-hole pairs. When incident light intensity is high, there are so many transitions occurring that the valence band is almost empty and the conduction band is full, a semiconductor's ability to absorb light becomes weakened. This phenomena is known as the saturable absorber effect. The properties of a saturable absorber depend on its carrier lifetime. The shorter the carrier lifetime, the faster the decay of the electron-hole pairs, and the faster the recovery of the saturable absorber. The saturable absorber effect can be used to make a mode-locked laser. Due to loss reduction when light intensity is high, a laser with a saturable absorber inside tends to mode-lock to produce short pulses with high instantaneous intensity rather than continuous wave (CW) lasing of comparatively low intensity.

Recently, fiber lasers with semiconductor saturable absorbers have been reported. See Reddy et al., "A Turnkey 1.5 micrometer Picosecond Er/Yb Fiber laser", *Optical Fiber Communication Conference*, PD17, pp 71-4 (1993). Reddy et al. report a fiber laser employing erbium-doped fiber pumped by a Nd:YLF (1.053 um) microlaser pumped by a diode laser. Mode-locking was achieved using an InGAsP saturable absorber deposited on a InP substrate.

The Reddy et al. laser was claimed to provide self-starting mode-locking and to operate insensitive to polarization drift in the fiber. Therefore, the laser might be made to be a "turnkey" operation: that is to say, a laser which will operate at the turn of a key. However, several serious shortcomings still exist, leaving unmet commercial needs with respect to short pulse lasers.

The necessary semiconductor saturable absorber is not commercially available. In order to configure a mode-locking fiber laser, the semiconductor saturable absorber must have both the correct band gap and carrier lifetime. Although semiconductor saturable absorbers can be grown using MBE (molecular beam) or MOCVD (metal organic chemical vapor deposition), the carrier lifetime of the semiconductor material grown by these machines is usually too long to enable Er-doped fiber laser mode-locking.

Short carrier lifetime has been achieved using low temperature MBE or MOCVD technique, however the techniques are difficult to reproduce and to control. It is fair to say that the making of semiconductor saturable absorbers for mode-locked fiber lasers or other solid state lasers has been perceived as a "black art" of sorts! Thus, the need remains for a commercially available semiconductor saturable absorber to enable the commercial availability of turnkey mode-locking lasers.

Further needed is a commercially exploitable means of ion implantation. Ion implantation on semiconductor saturable absorbers is used to control the carrier lifetime of the electron-hole pairs. Without modifications, semiconductor materials such as InGaAsP/InP or GaAlAs/GaAs have natural carrier lifetimes of 1 to 8 nanosecond (a nanosecond equals 10-9 second). A carrier lifetime of this order is too long to produce the short optical pulse in an Er-doped fiber laser. One way to shorten the carrier lifetime in the semiconductor material is to use ion implantation. Ion implantation produces variations or "defects" in the semiconductor material. The defects serve as recombination centers for electron-hole pairs. By controlling the dosage and energy of ion implantation, the carrier lifetime can be reduced to the value required. The typical required value would be 1 to 100 picoseconds (a picosecond equals $10^{-12}$ second). Ion implantation is a better technique for producing defects in semiconductor saturable absorbers than the techniques of using low temperature MBE or MOCVD. Ion implantation allows the defect density and distribution to be well-controlled through varying the implantation dosage and energy. Moreover, low temperature growth of semiconductor saturable absorbers is an extremely difficult process. Most MBE or MOCVD machines are normally used to produce low defect material. Thus, low temperature operation for the creation of high defect material is "abnormal operation" of MBE or MOCVD machinery and, as such, requires extensive calibration.

Lamprecht et al. studied time-resolved, luminescence in proton bombarded InP (indium phosphate) in order to measure the lifetime of photoexcited carriers as a function of the damage dose. (See Lamprecht et al., "Ultrashort carrier lifetimes in H+Bombarded InP", Appl. Phys. Lett. 59 (8), pp 926-928, Aug. 19, 1991). Results were interpreted as meaning that the decrease in lifetime was a direct consequence of the defects of trapping and recombination centers produced by the bombardment. Photoexcited carriers in the proton bombarded InP demonstrated ultrashort lifetimes down to 95 femtoseconds.

Van der Ziel et al. reported using ion implantation to make a mode-locked semiconductor laser wherein the region of saturable absorption was introduced by proton bombardment. See "Generation of subpicosecond pulses from an actively mode-locked GaAs laser in an external ring cavity," Appl. Phys. Lett. 39(11), pp 867-869, Dec. 1, 1981. The treatment of inducing saturable absorption through proton bombardment converts initially stable emission from untreated samples (prior to bombardment) to a pulsating output from treated samples. Van der Ziel's external cavity consisted of a collimating lens and a reflecting mirror. Proton bombardment of the mirror facet introduced saturable loss, yielding sub-picosecond pulses in mode-locked semiconductor lasers.

Although a mode-locked semiconductor laser using ion implantation technique was demonstrated by van der Ziel et al., semiconductor lasers have a short gain recovery time (on the order of a nanosecond, which is 10-9 seconds). Mode-locking involves gain saturation by the semiconductor control medium and loss saturation by the saturable absorber.

There still remains a need for mode-locking lasers with much slower gain recovery times such as an Er-doped fiber amplifier which has gain recovery time of 10 millisecond (a millisecond being $10^{-3}$ seconds). Moreover, there still remains an unmet need for an easy to operate (i.e. self starting and polarization insensitive), compact laser capable of producing short optical pulses at high repetition rates.

SUMMARY

The present invention provides a colliding pulse mode-locked (CPM) fiber ring laser which is capable of providing short optical pulses (on the order of 1-2 picoseconds or less) at high repetition rates. The invention provides compact, easy to operate CPM fiber ring laser capable of short optical pulses with repetition rates of several tens of megahertz. The CPM fiber laser can have a repetition rate which is four times faster than a linear laser containing the same fiber length and twice the rate os a unidirectional ring laser of the same length. This higher repetition rate is achieved by summing timing the outputs from both sides of the output coupler. Moreover, the CPM reduces chirping of the pulses so that the output pulsewidth can be shorter. The invention taught herein provides a polarization insensitive CPM fiber laser which can be as compact as a deck of playing cards—a tremendous reduction in size over CPM dye lasers which occupy space equivalent to a banquet table or greater. CPM dye lasers are open beam and require mirrors to bend the light beam into a ring. The fiber is easily wrapped into a ring and inherent to the fiber is a high degree of confinement of light. Further provided is a superior technique of ion implantation in semiconductor saturable absorbers.

Briefly and in general terms, a CPM fiber ring laser according to the invention includes a ring consisting of single mode fiber and a portion of erbium-doped fiber, a semiconductor saturable absorber, an output coupler, a wavelength division multiplier, and a plurality of lenses.

A more complete understanding and appreciation of the aims and objectives of the present invention may be achieved by referencing the following description of the preferred embodiment and the accompanying drawings.

DETAILED DESCRIPTION OF THE PREFERRED EMBODIMENT

Figure 1:
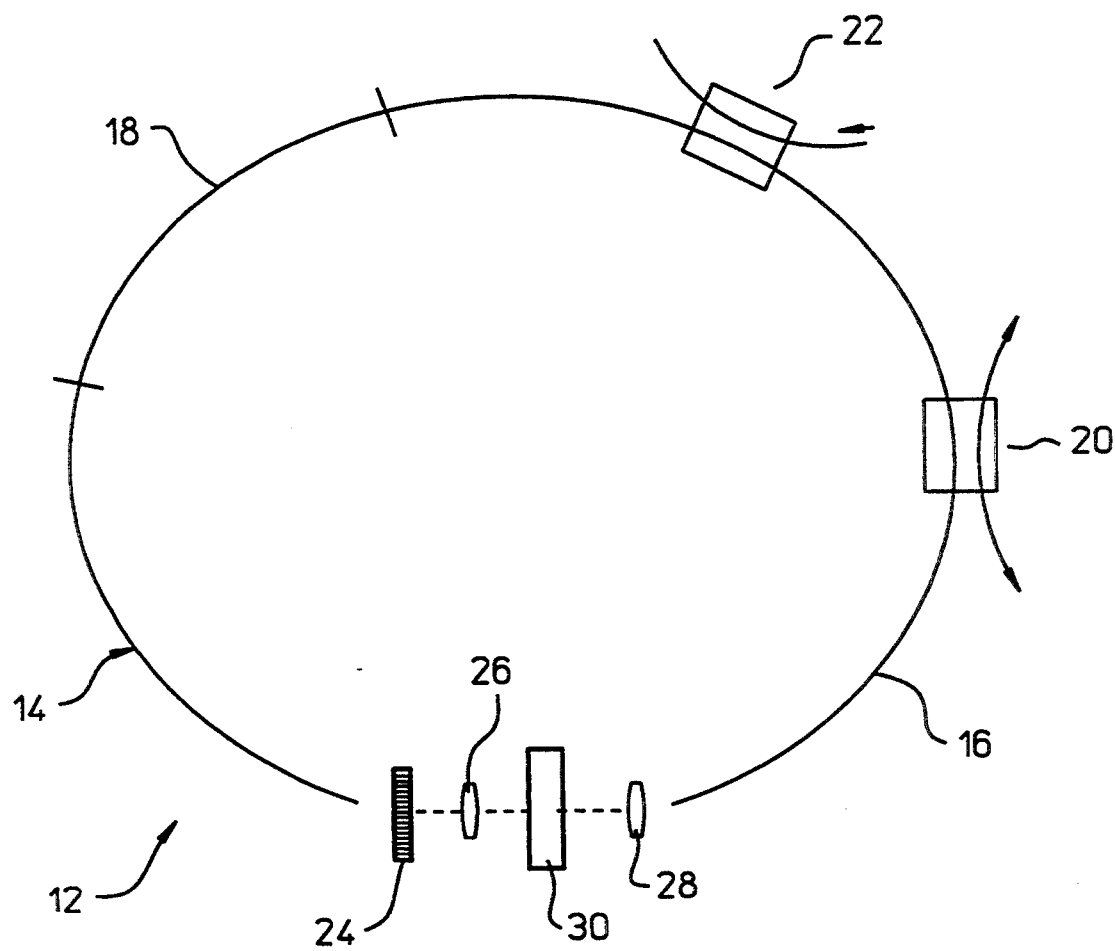
FIG. 1 shows a CPM fiber ring laser according to the invention.

As shown in the drawings for the purposes of illustration, the invention is embodied in a ring which includes a semiconductor saturable absorber (FIG. 1, 30). There has been a need for a laser which generates short optical pulses with high repetition rate but which is also compact and easy to use.

In accordance with the invention, a CPM fiber ring laser is assembled so as to include a semiconductor saturable absorber (FIG. 1, 30). The resulting laser does not require an isolator or mirror (which lowers manufacturing costs). The laser is compact due to the ring configuration; it will produce sub-picosecond optical pulses with repetition rates of several tens of megahertz.

As shown in FIG. 1, a CPM fiber ring laser generally 12, according to the invention, includes a fiber loop 14, consisting of both single mode fiber 16 and erbium-doped amplifier fiber 18. The fiber loop 14 has an output coupler 20, a wavelength division multiplexer coupler 22, a filter 24, a first and second lens 26, 28 and a semiconductor saturable absorber 30. Although the filter 24 helps to stabilize the laser, but is not essential to the functioning as the laser will operate without a filter. Likewise, lenses 26, 28 are not essential. It is apparent that FIG. 1 is not to scale.

The CPM fiber laser works as follows. As with most lasers, the optical pulses in a CPM fiber laser are started from spontaneous emission (or noise) from the fiber amplifier. The pulses are amplified by the fiber amplifier; the saturable absorber shapes the pulses. Since the loss is minimal when the two counterpropagating pulses collide on the semiconductor saturable absorber, eventually the two counterpropagating pulses become the main lasing mode of the CPM fiber laser.

The colliding pulse mode-locking configuration is especially useful for fiber lasers. Wrapping fiber into a ring configuration is easily done and is often preferable to a linear cavity due to the fiber's ability to confine light to a high degree. The colliding pulse effect enhances the pulse shaping mechanism of the saturable absorber.

The above described components, with the exception of the saturable absorber, are commercially available. The erbium-doped fiber amplifier can be purchased from AT&T; approximately 8 meter with Er dopant concentration of 300 ppm fiber is used in the invention described herein. The band pass filter has a center wavelength of 1553 nm and a bandwidth of 5.0 nm is available from Omega Optical Inc. The wavelength division multiplexer (980 nm/1550 nm) is available from Amphenol Corp., as are output couplers (ratio 17%). The GRIN lenses (0.22 pitch) are available through NSG American, Inc.

The semiconductor saturable absorber can be grown using an MOCVD machine (available from Swan, Inc.) and using substrate available from Sumitomo, Inc. On a substrate of InP, for example, a 2.0 (+/−0.2) micrometer epitaxial growth of InGaAsP is desirable, with a bandgap of 1.567 micrometers (+/−.030 micrometers). Depending on factors such as Er-doped fiber length, Er-doping concentration, and loss in the cavity, the epitaxial growth layer may be as thick as 6 micrometers.

An antireflection coating is applied to both side of the saturable absorber using $Si_xN_x$, at a wavelength of 1.55 micrometers. The antireflection coating service may be obtained commercially through Denton Vacuum, Inc.

The CPM configuration using a semiconductor saturable absorber provides an advantage in that it is not sensitive to polarization disturbance to the fiber as discovered through experimentation. It has been found that the invention, a CPM fiber with a saturable absorber, can tolerate large amounts of polarization disturbance. Through a comparison of colliding pulse configuration with that of unidirectional ring configuration, it was found experimentally that the CPM configuration can withstand much larger polarization disturbances.

Figure 2:
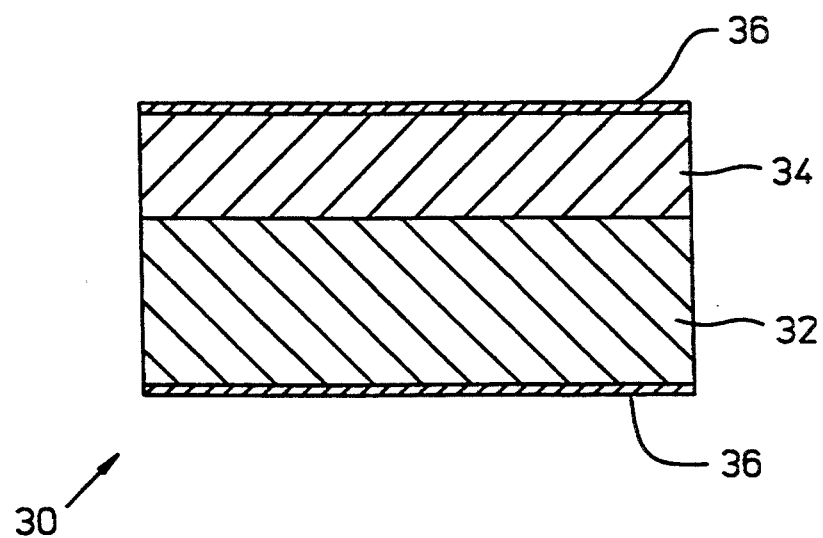
FIG. 2 is a detailed cross section of a saturable absorber.

FIG. 2 shows a cross section of a saturable absorber 30, including the active layer 34 and the substrate layer 32. The active layer 34 is 2.0 micrometers thick and the substrate layer 32 is 0.3 millimeters thick. The antireflection coating on each side 36 of the saturable absorber 30 reduces reflection to less than 1% per surface.

The absorptive layer is comprised of a combination of materials selected form group III and IV of the Periodic Table of the Elements. Preferred combinations include InGaAsP, InPAs and InGaAs. The substrate provides support to the absorptive layer and preferred combinations include InP and GaAs.

Higher implantation dosages on a saturable absorber tends to produce a laser generating a poor quality pulse, which has pedestal. Lower implantation dosages on the saturable absorber tends to produce wider pulses. The preferred protocols are those which produce a saturable absorber capable of short, pedestal free pulses.

Figure 3:
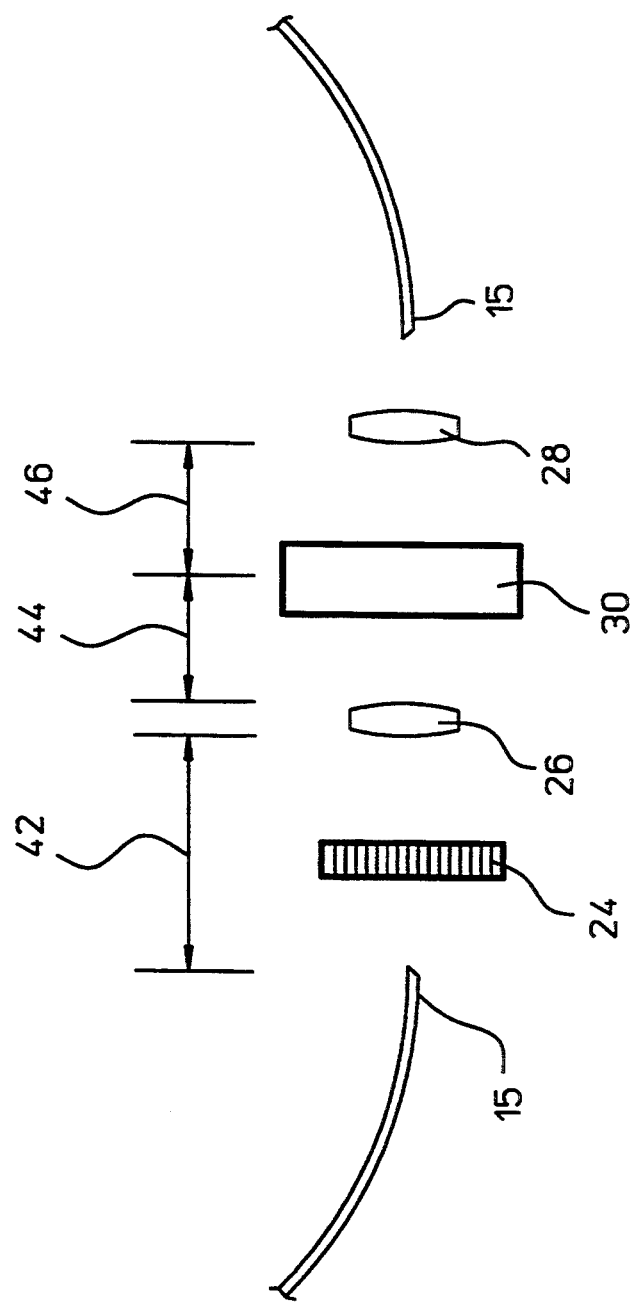
FIG. 3 is a schematic detailing the focusing scheme.

FIG. 3 depicts the optimum focusing scheme of the invention with respect to the relationship of the fiber ends 15 and the saturable absorber 30. The fiber ends 15 are polished at an angle of approximately 10°. Between the fiber ends 15 are placed, in the optical path, the filter 24, the first GRIN lens 26 (0.22 pitch, $\phi$3.0 mm), the saturable absorber 30, the second GRIN lens 28 (identical to first GRIN lens 26). The optimal spacing between fiber end 15 and first GRIN lens 26 is represented in FIG. 3 by 42 and in the preferred embodiment, 42 has the value of 7 mm. The spacing between first GRIN lens 26 and the saturable absorber 30 is represented in FIG. 3 by 44 and in the preferred embodiment 44 has the value of 2 mm. Likewise the distance between the saturable absorber 30 and the second GRIN lens 28 is represented by 46 and in the preferred embodiment 46 has the value of 2 mm. The lens configuration produces a 3:1 image reduction on the saturable absorber.

It is possible to insert the saturable absorber directly in the optical path without using a lens. This can be accomplished by lapping down the substrate layer of semiconductor saturable absorber to less than 100 micrometers and then placing the two fiber ends in direct contact with the saturable absorber. Since the saturable absorber is so thin, efficient coupling between the two fiber ends can be achieved without using lenses.

Figure 4A:
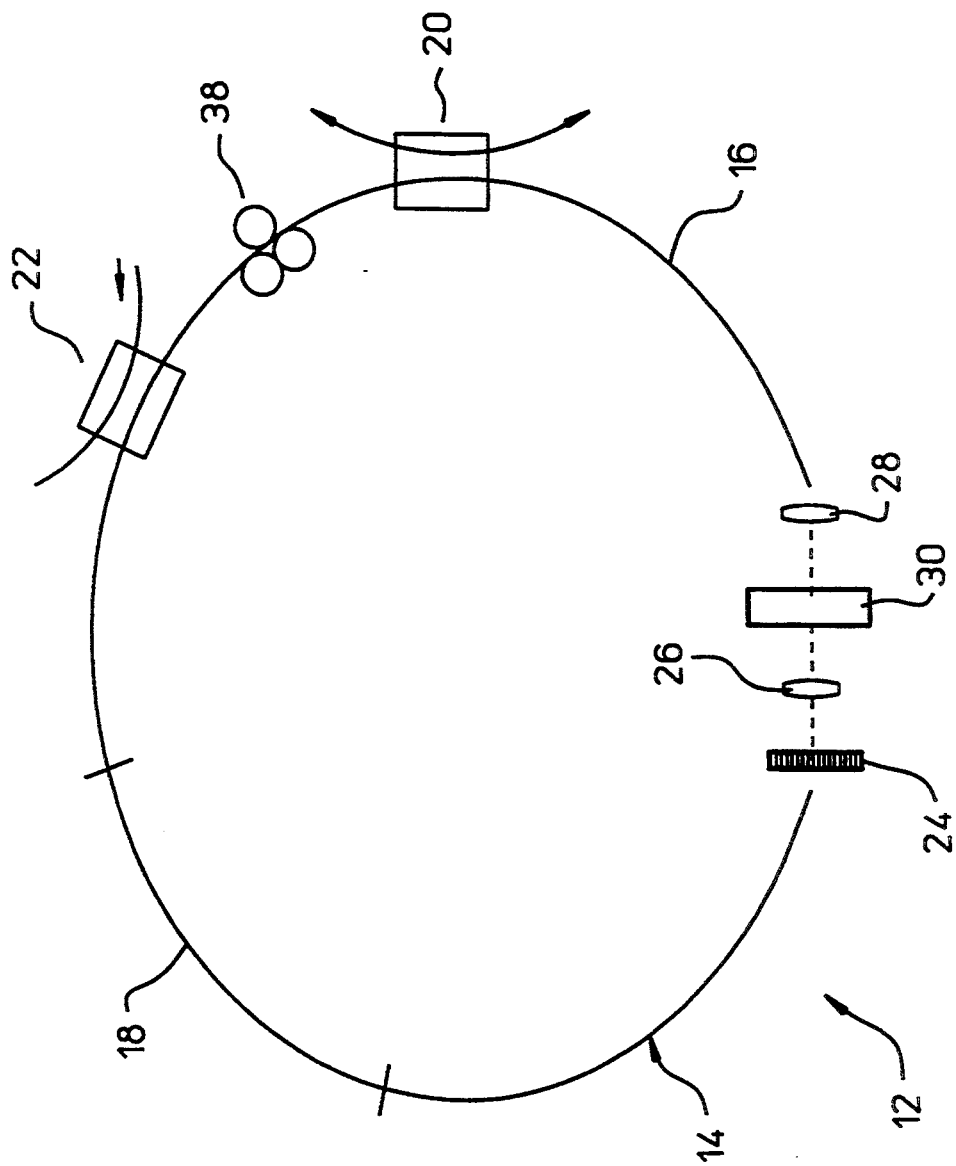
FIG. 4, including A and B, illustrates configurations used to demonstrate polarization insensitivity of the CPM configuration.
Figure 4B:
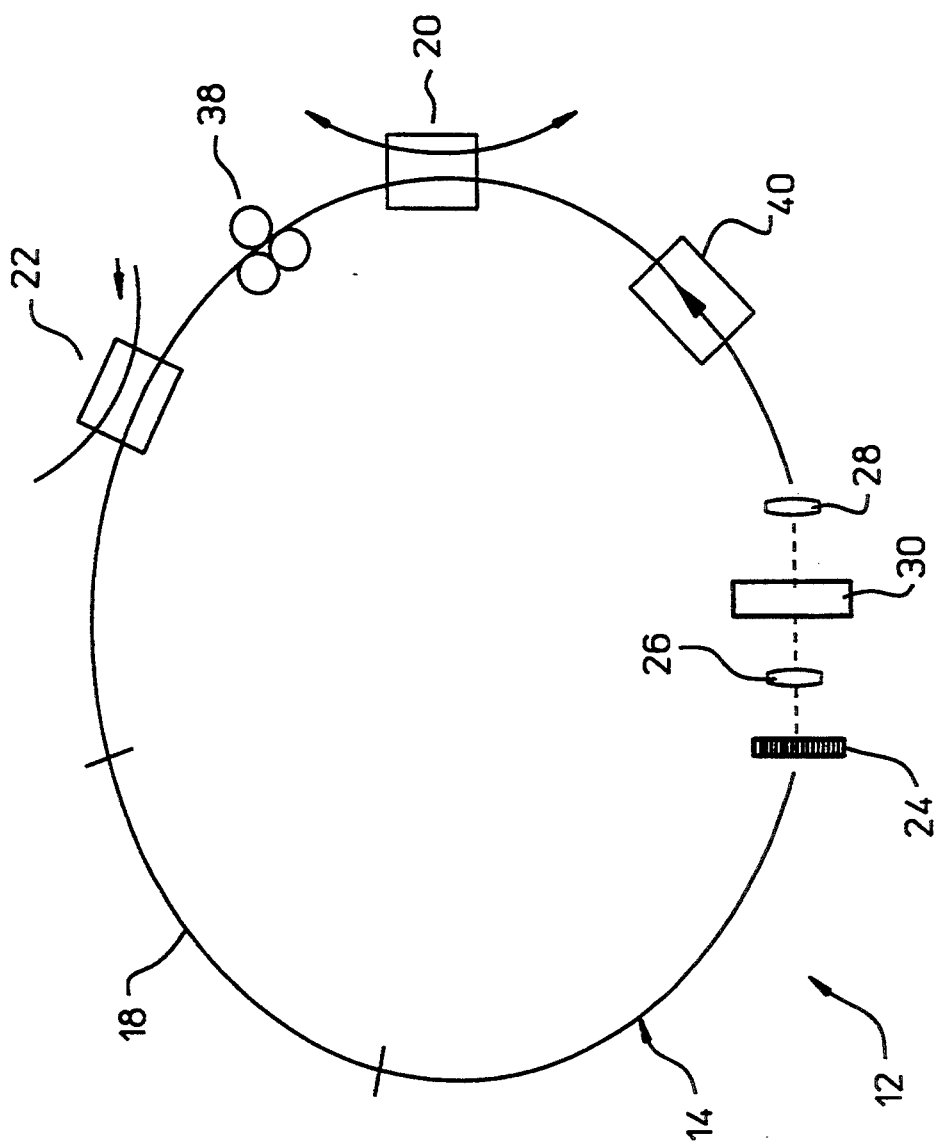

The colliding pulse configuration reduced the sensitivity of the mode-locked fiber laser to the polarization variation. Two configurations, shown in FIG. 4A and FIG. 4B, were compared. With the exception of the isolator 40 in FIG. 4B, the configurations depicted in FIG. 4A and 4B are identically constructed, consisting of a fiber loop 14 (including both single mode fiber 16 and erbium-doped fiber 18) and associated with the fiber in the optical path an output coupler 20, a wavelength division multiplexer coupler 22, a polarization controller 38, a filter 24, a pair of GRIN lenses 26, 28 and a semiconductor saturable absorber 30. The configuration depicted in FIG. 4A can tolerate large polarization variation. The polarization controller 38 consists of three fiber loops. Each of the fiber loops simulates a quarter wave plate. The adjustment of polarization is accomplished by changing the orientation of the fiber loop in a 0 to 180 degree range. When FIG. 4A laser is mode-locked, stable mode-locked output can be maintained when the polarization controller is in the 0 to 120 degree range.

The FIG. 4B laser configuration can tolerate much less polarization variation. When the FIG. 4B laser is mode-locked, stable mode-locked output can be maintained only when polarization controller is varied within 5 degrees (as compared with 120 degrees in laser configuration 4A).

Thus, the CPM (colliding pulse mode-locked) configuration tolerates much more polarization variation than a unidirectional ring configuration.

From the foregoing it will be appreciated that the present invention provides a method and apparatus for generating short optical pulses on the order of 1–2 picoseconds or less, with repetition rates in the tens of megahertz, which is self-starting and polarization insensitive.

A laser system that embodies the principles of the invention is less sensitive to polarization variation, is capable of higher repetition rates, requires fewer components and, therefore, lowers production costs. For these and other advantages provided by the invention herein, it is superior to lasers currently available in its ease of use.

It will be apparent that different working embodiments in a wide range can be formed without deviating from the spirit and scope of the present invention. Therefore, the present invention is not restricted by the specific embodiments described and illustrated herein except as being limited in the appended claims.

What is claimed is:

1. A ring laser having an optical path comprising:
    a fiber loop, said fiber loop having a light exit opening optically coupled to the fiber loop to enable pulse emission, said fiber loop comprised of a gain medium operable to amplify light signals
    a pump laser, to excite the gain medium, said pump laser optically coupled to the fiber loop; and
    a semiconductor satarable absorber, said semiconductor saturable absorber comprised of an absorption layer of III-IV semiconductor material and an adjacent substrate layer, optically coupled to the pump laser and the fiber loop, said semiconductor saturable absorber thereby modelocking said laser.

2. A ring laser as recited in claim 1 wherein the gain medium is a doped fiber.

3. A ring laser as recited in claim 2 wherein the doped fiber is an erbium-doped fiber.

4. A ring laser as recited in claim 1 wherein the pumping means comprises an optical pump laser and a wavelength division multiplexer.

5. A ring laser as recited in claim 1 wherein the semiconductor saturable absorber is comprised of an absorption layer and a substrate layer, wherein the absorption layer is a III-IV semiconductor and the substrate layer is selected from the group consisting of InP and GaAs.

6. A ring laser as recited in claim 5 wherein the absorption layer is selected from the group consisting of InGaPAs, InPAs and InGaAs.

7. A ring laser as recited in claim 6 wherein the semiconductor saturable absorber is implanted with ion species in a region on the saturable absorber through which the light signal passes.

8. A ring laser as recited in claim 7 wherein the ion species have concentrations corresponding to bombardment of the semiconductor saturable absorber with ions with energies of no less than 10 keV and at a dosage of no less than $3 \times 10^{13}$ 1/cm$^2$.

9. A ring laser as recited in claim 7 wherein the ion species have concentrations corresponding to bombardment of the saturable absorber with ions with a plurality of energy levels and dosage levels.

10. A ring laser as in claim 1 further comprising focusing means on each side of the pulse means in the optical path for focusing the light in a predetermined region on the saturable absorber.

11. A ring laser as recited in claim 10 wherein the focusing means comprises a pair of lenses positioned one on either side of the saturable absorber and in the optical path.

12. A ring laser as recited in claim 1 wherein the ring comprises single-mode fiber containing dopant selected from the group of elements consisting of the rare earth elements and the transition metals.

13. A ring laser as recited in claim 12 wherein the ring further comprises fiber that is single-mode and undoped.

14. A ring laser as in claim 1 further comprising a polarization controlling means in the optical path for varying the polarization state of light in the ring laser.

15. A ring laser as in claim 1 in which the ring is a colliding pulse mode-locking fiber wherein the light signal oscillation is bi-directional (clockwise and counterclockwise).

16. A method of generating light in a ring laser comprising the steps of:
    selecting a fiber loop having a light exit opening, said fiber loop being doped with an element selected from the group consisting of the rare earth elements and the transition metals;
    assembling the fiber loop into an optically coupled configuration comprised of:
    a pump laser; and
    a semiconductor saturable absorber, wherein the saturable absorber is
    selected from group III-IV semiconductors;
    placing the ring laser into operation wherein said operation is characterized by sub-picosecond pulses with repetition rates in excess of 1 Megahertz.

17. A method as recited in claim 16 wherein the assembling of the fiber loop further includes the step of selecting the semiconductor saturable absorber that is comprised of an absorption layer and a substrate layer wherein the absorption layer is selected from the group consisting of InGaPAs, InPAs and InGaAs, and the substrate layer is selected from the group consisting of InP and GaAs.

18. A method as recited in claim 17 wherein the step of selecting a semiconductor saturable absorber further includes selecting a semiconductor saturable absorber which has undergone ion implantation whereby ionic species have a concentration corresponding to bombardment of the semiconductor saturable absorber with ionic species with energy of no less than 10 keV at a dosage of no less than $3 \times 10^{13}$ $1/cm^2$.

19. A method as recited in claim 17 wherein the selecting of a semiconductor saturable absorber further includes the step of selecting a semiconductor saturable absorber which has undergone ion implantation whereby ionic species have concentrations corresponding to a plurality of energy levels and dosage levels.

20. A method as recited in claim 16 wherein the step of assembling the fiber loop into an optically coupled configuration further comprises the step of selecting and optically coupling a pair of lenses for focusing light in a predetermined region of the semiconductor saturable absorber.

21. A method as recited in claim 16 wherein the step of assembling the fiber loop into an optically coupled configuration further comprises the step of selecting and optically coupling a polarization controller for varying the polarization state of light in the ring laser.

* * * * *